(12) United States Patent
Khan

(10) Patent No.: US 9,506,800 B2
(45) Date of Patent: Nov. 29, 2016

(54) SYSTEM AND METHOD FOR MEASURING FLOW RATES FOR INDIVIDUAL PETROLEUM WELLS IN A WELL PAD FIELD

(75) Inventor: Vladimir Konstantinovich Khan, Novosibirsk (RU)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 320 days.

(21) Appl. No.: 14/127,499

(22) PCT Filed: Jul. 4, 2011

(86) PCT No.: PCT/RU2011/000482
§ 371 (c)(1),
(2), (4) Date: Feb. 14, 2014

(87) PCT Pub. No.: WO2013/006075
PCT Pub. Date: Jan. 10, 2013

(65) Prior Publication Data
US 2014/0150520 A1  Jun. 5, 2014

(51) Int. Cl.
*G01F 25/00* (2006.01)
*G01F 1/36* (2006.01)
*G01F 1/58* (2006.01)
*G01F 1/74* (2006.01)
*E21B 47/10* (2012.01)

(52) U.S. Cl.
CPC .......... *G01F 25/0007* (2013.01); *E21B 47/10* (2013.01); *G01F 1/36* (2013.01); *G01F 1/58* (2013.01); *G01F 1/74* (2013.01)

(58) Field of Classification Search
CPC ...... G01F 25/0007; G01F 1/36; G01F 13/00; G01F 1/44; G01F 1/74; G01N 33/00
USPC ...... 73/1.26, 1.35, 861.04; 166/52, 245, 366
See application file for complete search history.

(56) References Cited

U.S. PATENT DOCUMENTS

| | | | |
|---|---|---|---|
| 2,835,273 A | 5/1958 | McDonald | |
| 5,591,922 A | 1/1997 | Segeral et al. | |
| 5,654,502 A * | 8/1997 | Dutton | G01N 33/2823 73/152.18 |
| 5,927,330 A * | 7/1999 | Minton | F16K 11/076 137/625.11 |
| 6,265,713 B1 | 7/2001 | Berard et al. | |
| 6,405,604 B1 * | 6/2002 | Berard | G01F 1/74 73/861.04 |
| 7,105,805 B2 | 9/2006 | Berard et al. | |

(Continued)

OTHER PUBLICATIONS

International Search Report mailed on Apr. 5, 2012 for International Patent Application No. PCT/RU2011/000482, filed on Jul. 4, 2011, 1 page.

(Continued)

*Primary Examiner* — Peter Macchiarolo
*Assistant Examiner* — Anthony W Megna Fuentes
(74) *Attorney, Agent, or Firm* — Cameron Sneddon

(57) ABSTRACT

A dynamic calibration system and method for measuring flow rates for individual petroleum wells in a well pad are provided. The dynamic calibration system and method include means for performing custom-calibration of said pressure sensor for each individual well to enhance the accuracy of the resulting flow rate measurements.

16 Claims, 2 Drawing Sheets

(56) References Cited

U.S. PATENT DOCUMENTS

| | | | |
|---|---|---|---|
| 7,139,667 B2 * | 11/2006 | Rothman | G01F 1/363 702/50 |
| 7,240,568 B2 | 7/2007 | Atkinson | |
| 7,684,540 B2 | 3/2010 | Groves et al. | |
| 2007/0090935 A1 | 4/2007 | Miller et al. | |
| 2007/0175640 A1 | 8/2007 | Atencio et al. | |
| 2007/0291898 A1 * | 12/2007 | Groves | A61B 6/4241 378/51 |
| 2008/0115560 A1 | 5/2008 | Shareef et al. | |
| 2010/0023269 A1 | 1/2010 | Yusti et al. | |

OTHER PUBLICATIONS

"Measuring Uncertainty Differential Pressure Measurement Comparison: Classic Transmitter—"autarkon"", Metra Energie-Messtechnik, Apr. 29, 2005, 8 pages.

European Search Report issued in EP11869053.6 on Nov. 18, 2014, 9 pages.

Williams, "Status of Multiphase Flow Measurement Research", SPE 28515—SPE Annual Technical Conference and Exhibition, New Orleans, Louisiana, Sep. 25-28, 1994, 10 pages.

\* cited by examiner

SYSTEM AND METHOD FOR MEASURING FLOW RATES FOR INDIVIDUAL PETROLEUM WELLS IN A WELL PAD FIELD

FIELD

This invention relates to flow rate measurements for oil effluents of petroleum wells. The oil effluents are typically made up of multiphase fluid mixtures comprising water, oil and gas. The invention particularly relates to an improved system and method for measuring flow rates for oil effluents from individual petroleum wells in a group of wells using a single multiphase flowmeter.

BACKGROUND

The ability of the oil industry to optimize the production of a reservoir relies on the possibility of evaluating the well effluent at regular intervals, in terms of quantity (flow rate) and of composition (the proportions of the various phases). This evaluation makes it possible to determine what corrective actions may need to be taken. Generally, measuring the flow rate of oil well effluents is a complex problem because the effluents are usually made up of three phases, and because of the changes in the flow conditions to which they are subject such as pressure, temperature, shape of pipes etc.

A traditional practice for measuring the flow rate of an oil well effluent is to separate the effluent into its component phases and to perform measurements on the phases separated in this way. This practice requires the installation of bulky separators on site. It also requires additional pipes to be put into place for connecting the separators. A preferred practice employs multiphase flow meters (MPFMs) that can measure the total flow rate and the individual flow rates or fractions of oil, gas and water of the effluent without prior separation. Numerous different types of MPFMs have been proposed. A description of such proposals can be found, for instance, in the publication SPE 28515 (SPE Annual Technical Conference, New Orleans, Sep. 25-28, 1994) by J. Williams entitled "Status of multiphase flow measurement research". One type of well known MPFM is described in U.S. Pat. No. 6,405,604 issued to Berard et al. on Jun. 18, 2002. The MPFM described in the Berard patent combines Venturi and dual energy gamma fraction measurements. Variations of the above MPFM have been described in the following US patents: U.S. Pat. No. 6,265,713; U.S. Pat. No. 7,105,805; U.S. Pat. No. 7,240,568 all assigned to Schlumberger Technology Corporation.

In the oil industry, it is necessary to periodically monitor the flow rate of produced fluids obtained from each well of a group of wells located in the vicinity of each other. Such group of wells is commonly referred to as a "well pad". In order to save on equipment, individual wells in a well pad are tested separately, one at a time, using one set of measuring devices. So for instance, it is preferred to use a single separator set up or a single multiphase flowmeter set up for servicing the wells in a well pad. To accomplish this, typically, a well switch directs the flow of the well that is selected to be tested to the separator or the flowmeter. The switch position is usually controlled by an automatic control system. However, because the flow rate and the fluid composition of the well effluents may differ significantly from different wells in a well pad it has been difficult to get accurate measurements, especially when using a single multiphase flowmeter. In fact, it is a rare situation when all wells from the well pad are of the same productivity such that the product fluids are all discharged at substantially the same pressure. Typically, there are wide disparities in well production and in the flow rates of the produced fluids from different wells in a well pad. For example, it is not unusual for the product flow rate of the lowest producing well to be about one-third or even less of the product flow rate of the highest producing well. Therefore, there exists a need to improve the accuracy of the MPFMs used to measure the flow rates of produced fluids from multiple wells in a well pad.

SUMMARY

The invention overcomes the aforementioned as well as other shortcomings of the prior art as it will become more apparent to those with ordinary skill in this art, after reading the detailed specification of this invention. The invention, inter alia, provides an improved system and method that "custom-calibrates" the MPFM flow meter for each individual well in a well pad to enhance the accuracy of the resulting flow measurements. The term "custom-calibrates", or "custom-calibration" is also referred to hereinafter as "custom sequential calibration", or "dynamic calibration". The invention generally relates to an improved system and method for measuring flow rates for oil effluents from individual petroleum wells in a well pad using a single MPFM. The MPFM has a pressure sensor that it is custom-calibrated for each individual well to enhance the accuracy of the resulting flow measurements. The pressure sensor is preferably a differential pressure sensor. The system also comprises a valve assembly connected between each of the individual petroleum wells and the multiphase flowmeter that connects and disconnects an effluent from a single selected individual well to the multiphase flowmeter and means for performing custom-calibration of the pressure sensor for each individual well to enhance the accuracy of the resulting flow rate measurements.

Another aspect of the invention is directed to a method for measuring flow rates for individual wells in a well pad by a single MPFM. The method comprises determining a pressure range for each of the wells in the well pad; selecting an individual well for which a pressure range has been determined; calibrating the differential pressure flow meter with the pre-determined pressure range corresponding to the selected well; and measuring the flow rate of the selected well. These steps are repeated until the flow rate of all of the wells is measured.

DETAILED DESCRIPTION OF THE EMBODIMENTS

One aspect of the invention is directed to a system for measuring flow rates for effluents of individual petroleum wells in a well pad using a single multiphase meter. The system comprises a multiphase flowmeter having means for creating a measurable pressure drop and a pressure sensor for sensing the pressure drop. The system further comprises a valve assembly connected between each of the individual petroleum wells and the multiphase flowmeter that connects and disconnects an effluent from a single selected individual well to the multiphase flowmeter. The system also comprises means for performing custom-calibration of the pressure sensor for each individual well to enhance the accuracy of the resulting flow rate measurements. The custom-calibration means include a digital controller operably connected to the pressure sensor and the valve assembly that determines a pressure range for each of the wells in the well pad, selects an individual well for flow rate measurement, and calibrates the flow meter with the pre-determined pressure range corresponding to the selected well.

Figure 1:
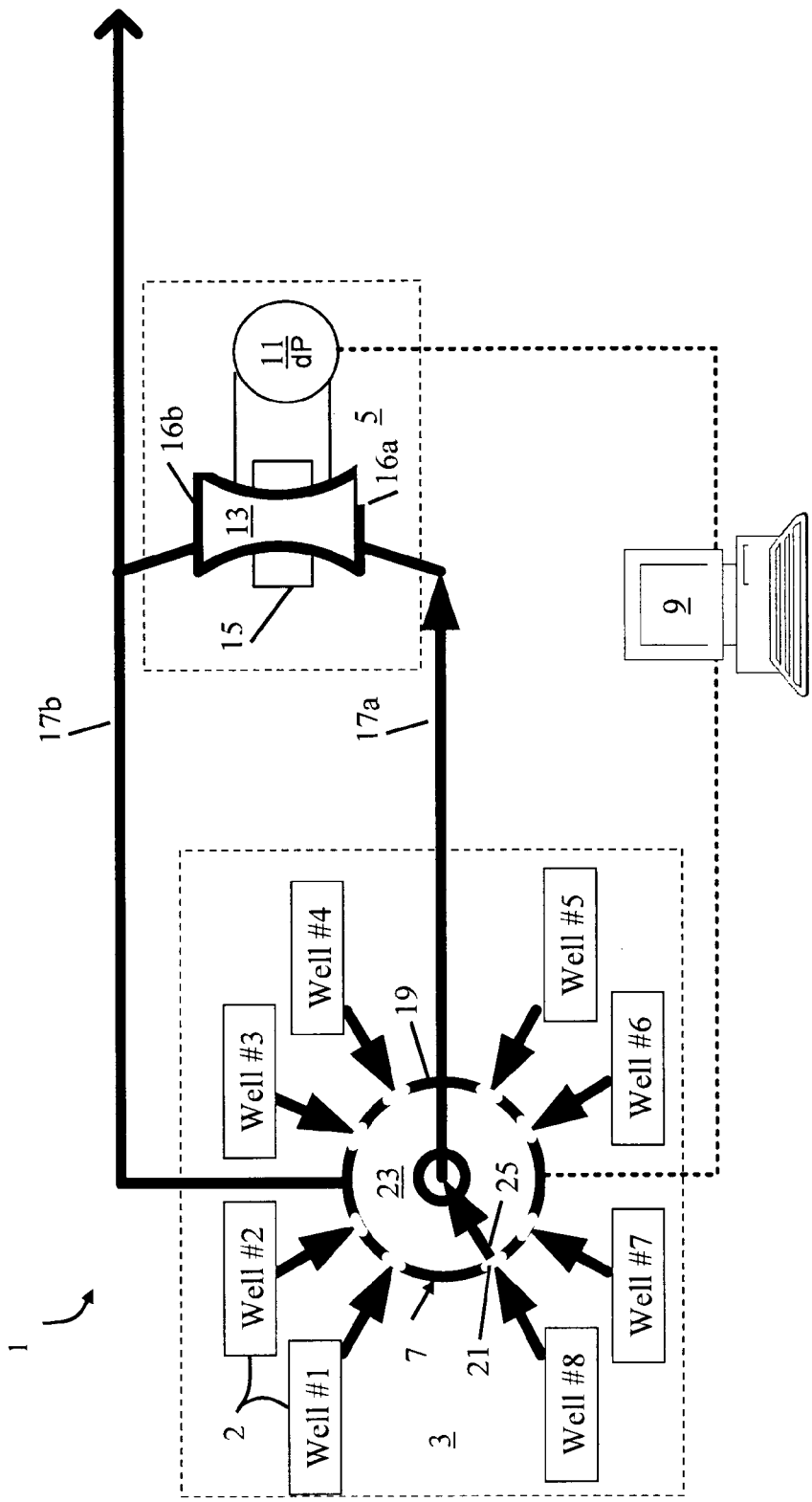
FIG. 1 is a schematic diagram of a preferred embodiment of the system of the invention.

FIG. 1 is a schematic representation of an example of the system 1 of the invention installed on the petroleum wells 2 of a well pad 3. A well pad 3 may include 2 or more wells. The one shown in FIG. 1 includes eight wells 2. The system 1 is generally comprised of a MPFM 5, a rotary valve assembly 7 capable of sequentially connecting the fluid product output of each of the wells 2 to the MPFM 5, and a digital controller 9 operably connected to both the MPFM 5 and the valve assembly 7.

The MPFM 5 includes a differential pressure sensor 11, a Venturi 13, and a dual energy fraction meter 15 mounted across the mid-section or throat of the Venturi 13. The MPFM 5 comprises a pipe section having a convergent Venturi 13 whose narrowest portion is referred to as the throat. The pipe is preferably disposed vertically and the effluent flows upwards through the pipe and through the Venturi. The constriction of the flow section in the Venturi induces a pressure drop $\Delta p$. The pressure drop $\Delta p$ is associated with the total mass flow rate Q and with the density $\rho_m$ of the multiphase effluent by an equation that is well known in the MPFM industry. For the Venturi nozzle 13 (or a choke) the total flow rate Q is proportional to the square root of the pressure drop $\Delta p$ across the Venturi as shown by the following simplified equation:

$$Q \sim \sqrt{(\Delta p)} \quad \text{Equation 1}$$

The pressure drop $\Delta p$ is measured by means of a differential pressure sensor 11 connected to two pressure takeoffs opening out into the measurement section. As indicated in the FIG. 1, the differential pressure sensor 11 is connected across the inlet and outlet sides of the Venturi nozzle 13. Other configurations of the differential pressure sensor 11 can be used. For example, differential pressure sensor 11 can be connected with the first measuring point upstream the Venturi throat and the second measuring point situated at the throat of the Venturi, Also, it should be understood that instead of a differential pressure sensor, two absolute pressure sensors could be used to effectuate the same measurement. In a variant of the invention, the measurement may also be performed by means of two absolute pressure sensors connected to the same pressure takeoffs. The density $\rho_m$ of the effluent multiphase mixture is determined by means of a sensor 15 which measures the attenuation of gamma rays, by using a source and a detector placed on opposite sides of the Venturi throat. The inlet 16a of the Venturi nozzle 13 is connected to the outlet conduit 17a of the rotary valve assembly 7, while the outlet 16b of the Venturi nozzle 13 is connected to the combined outlet conduit 17b of all of the wells 2 of the well pad 3.

The MPFM is preferably of the type that includes besides the differential pressure sensor, a Venturi and a gamma ray densitometer such as for example the one commercially used by Schlumberger under the names PhaseWatcher and PhaseTester. It should be understood, however, that the invention is advantageous in combination with any type of MPFM that includes a differential pressure sensor. For instance fraction meter 15 can be an X-ray based fraction meter as the one described in U.S. Pat. No. 7,684,540 issued to Schlumberger Technology Corporation.

There are many factors that could contribute to the overall uncertainty associated with the total flow rate such as the Venturi throat diameter, fluid densities and fractions, viscosity, differential pressure measurement accuracy etc. However, the applicants have realized that during the metering of individual wells in a well pad the effects of the differential pressure measurement inaccuracies on the overall accuracy of the flow measurement are predominant. This is especially true, if the various wells have very different flow rates. The other contributing factors contribute more or less in equal amounts to the overall uncertainty and can be controlled using existing, known methods. Thus, the accurate calibration of the differential pressure sensor 11 of the flow meter 5 for each well is the single largest factor in obtaining accurate flow measurements. For instance from simplified equation 1, one can deduce that the relative uncertainty or percent error of the differential pressure measurements is responsible for about half of the relative uncertainty of the measurement of the total flow rate:

$$\delta Q \sim \frac{1}{2} [\delta(\Delta p)] \quad \text{Equation 2}$$

Generally, the differential pressure sensor performance depends on the calibrated span, i.e., the uncertainty is a percentage of the calibrated span of the pressure drop. The higher the pressure drop measured, the lower the relative uncertainty in the corresponding computed flow rate.

In the example of FIG. 1, the MPFM 5 is a multi-phase flow meter (MPFM) is capable, via the dual energy fraction meter 15, of determining, in addition to the overall flow rate of the well effluent, the mass or volume fraction of each phase in the multiphase effluent.

The MPFM flowmeter may also contain other measuring units, for example a line pressure sensor, line temperature sensor, fraction meter, and other units, but the accuracy of such other units is not affected as strongly by the variation of well flow rates as accuracy of the differential pressure sensor.

The rotary valve assembly 7 is included in a valve body 19 which is fluidly connected to the output of each of the wells 2. The interior of the valve body 19 is annular. Fluid passages 21 are disposed around the inner circumference of the valve body 19, as shown in FIG. 1. Each one of these fluid passages 21 is connected to the output of one individual well 2. A cylindrically-shaped rotary valve member 23 is rotatably disposed within the annular interior of the valve body 19. The valve member 23 includes a single, radially-disposed passage 25 that is connected at its inner end to the outlet conduit 17a. The outer end of the passage 25 is connectable to a selected one of the fluid passages 21 by means of a motor (not shown) that rotates the cylindrical valve member 23 until the passage 25 is properly aligned with the selected passage 21. While the valve assembly 7 is illustrated as a single well switching device in this example of the invention, it could also be realized by any one of a number of arrangements of remotely controlled valves, designed to direct flow from individual wells sequentially to the MPFM 5, the most important aspect being the ability to connect the fluid product of a single selected well 2 to the MPFM 5.

The digital controller 9 is operatively connected to both the differential pressure sensor 11 of the MPFM 5 and the motor of the rotary valve assembly 7. Accordingly, the digital controller 9 calibrates and operates the MPFM 5 and operates the rotary valve assembly 7. For the purposes of determining a pressure calibration range for each well, the digital controller 9 first assigns a pressure range to the differential pressure sensor 11 that is high enough to encompass the highest expected pressure drop to be measured from any of the wells 2. The digital controller then activates the rotary valve number 23 of the valve assembly 7 to align the differential pressure sensor 11 with a selected well, e.g., well #2. The digital controller 9 then computes the flow rate of the effluent from the output of the differential pressure sensor 11. Next, the digital controller 9 computes a maximum expected flow rate from the calculated flow rate in order to determine a pressure calibration range for the selected well #2, and records the pressure calibration range for the selected well. This cycle is repeated until a pressure calibration range for each of the wells 2 is determined and recorded.

Once the pressure sensor of the MPFM is calibrated for all the individual wells and the calibration data are stored in the digital controller, the system is ready for the actual measurement or flow monitoring operation. In this operation, the digital controller 9 further selects a particular well 2 for flow rate measurement, calibrates the pressure sensor 11 with the pressure calibration range corresponding to the selected well 2, aligns the passage 25 of the rotary valve member 23 with the selected well 2 (i.e. well #1), measures the flow rate, and repeats this cycle for each well until the flow rates of all of the wells 2 are measured. While the digital controller 9 is shown as a component separate from the MPFM 5, it may also be the controller of form part of the controller of the MPFM.

Figure 2:
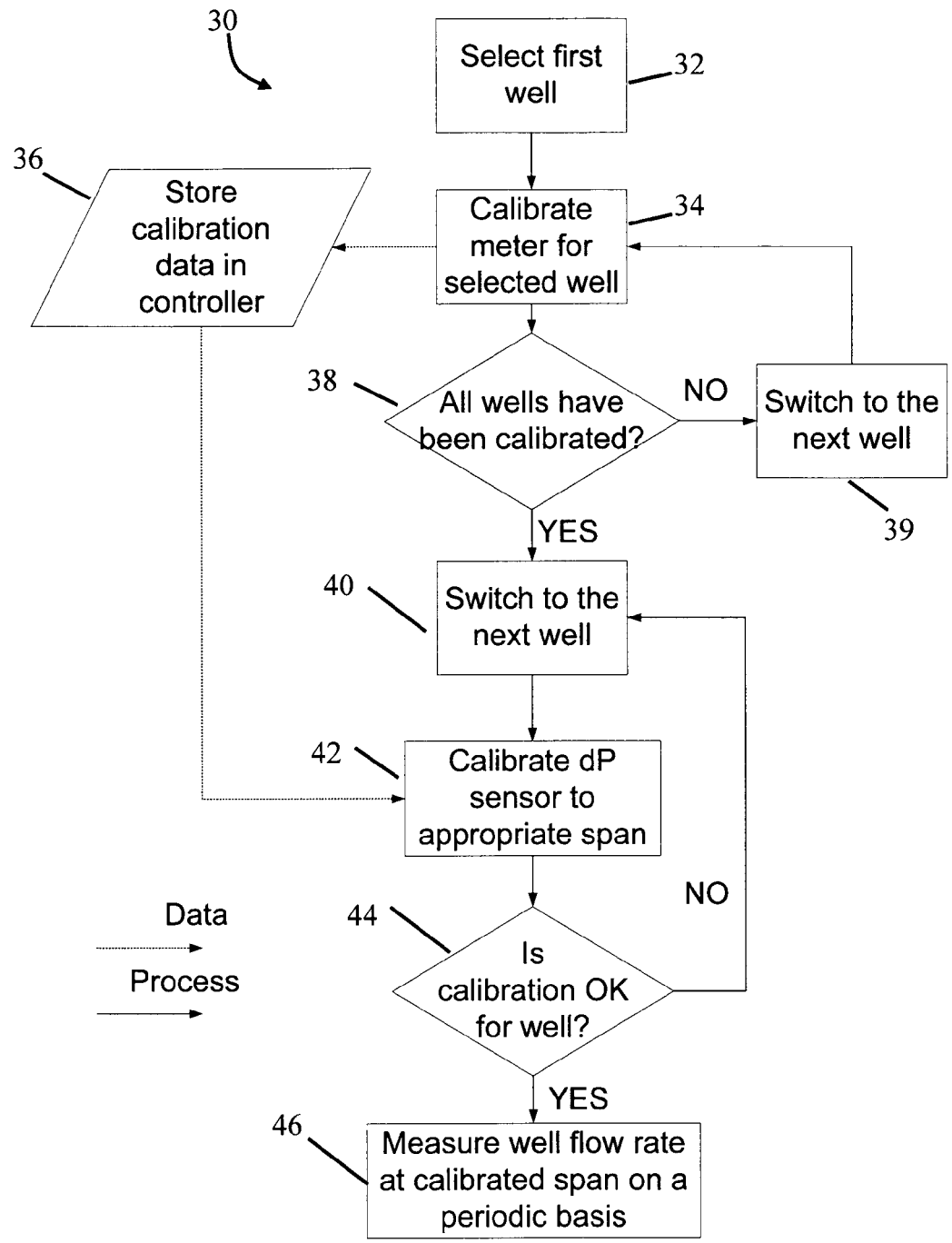
FIG. 2 is a flow chart illustrating a preferred embodiment of the method of the invention.

The method 30 of the invention that is implemented by the digital controller 9 is illustrated in the flow chart of FIG. 2. In the first step 32 of the method 30, the controller 9 selects a well 2 to be calibrated (which is well #1 in this example), and actuates the rotary valve assembly 7 to rotate the valve member 23 until its passageway 25 is aligned with the outlet 21 in the valve body 19 corresponding to the selected well 2 (i.e., well #1). Consequently, the fluid product of the selected well 2 (well #1) is routed through the Venturi nozzle 13 via outlet conduit 17*a*.

In the next step 34, the controller 9 measures the pressure drop Δp of the effluent from the selected well 2 (i.e., well #1) via the differential pressure sensor 11. Of course, in order to measure this pressure, it is necessary that the differential pressure sensor 11 be calibrated with an initial pressure range. For this purpose, a calibration range is selected that is broad enough to include the maximum expected pressure from the most productive well. While such a broad pressure range will not give a highly accurate pressure reading for wells 2 with productivities that are only a small fraction of the productivity of the most productive well 2, the reading obtained will be sufficiently accurate for the purpose of determining a pressure that can be used to custom-calibrate the differential pressure sensor 11 when the flow measurement steps for the selected well 2 are implemented. The controller 9 then proceeds to determine a calibration range for the selected well based on this initial pressure measurement. As there is some variability in the pressure of the product flow from a particular well over time, the calibration range is determined by multiplying the measured pressure by a factor greater than 1.0 to obtain a maximum expected pressure. In the example described hereinafter, this factor may vary between about 1.10 and 2.00. The factor will depend and will be determined on a case by case basis, however, generally speaking the highest factors should be used for the least productive, lowest pressure wells 2. The highest expected pressure measurement is determined by multiplying the highest measured differential pressure of the particular well by a factor greater than 1.00. This factor may vary between about 1.10 and about 2.00, such as about 1.10 and about 1.20 for maximum measured pressures of between about 5,000 and about 25 millibars, such as between about 4,000 and about 500 millibars, or between about 4,000 and about 25 millibars.

After the controller 9 has determined a calibration range for the selected well 2, it records this calibration range as indicated by step 36. It then proceeds to step 38, and inquires whether a calibration range has been determined for all of the wells 2. If the answer to the inquiry is "no", then the controller 9 proceeds to step 39 and actuates the rotary valve assembly to select the next well. Steps 32-38 are repeated until the answer to inquiry step 38 is "yes".

In steps 40-46, the flow rate of each of the wells 2 is measured. Specifically, in step 40, the digital controller selects a well 2 of interest. In the next step 42, the digital controller 9 re-calibrates the differential pressure sensor 11 with the calibration range corresponding to the selected well 2 that was previously determined via steps 32-38. In step 44, the digital controller 9 inquires whether the corresponding calibration range is current enough so that accurate measurement results are likely. This is accomplished by determining whether the well flow rate has increased or decreased substantially since the last time a calibration range was determined for that particular well. Alternatively, it may be accomplished by comparing the current date with the last date that a calibration range was determined for the selected well. For instance, it is generally expected that typically the flowrates from a stable well will not change or change slightly in short time intervals such as a week or a month, unless some other event has occurred i.e., electrical submersible pump regime change, fracturing, choke change etc. If the answer to the inquiry of step 44 is "no", then a new calibration range is determined by the controller by repeating steps 32-38. The controller stores the calibration data for each individual well. The data can also be updated periodically as may be needed. If the answer to the inquiry of step 44 is "yes", then the digital controller proceeds to method step 46, and (1) actuates the rotary valve assembly 7 to rotate the valve member 23 until its passageway 25 is aligned with the outlet 21 in the valve body 19 corresponding to the selected well 2, and (2) proceeds to measure the flow rate via the differential flow meter 5.

The process of synchronization between the well switch, well profile and calibration settings can be performed by the MPFM controller or external controller with appropriate software. Preferably, the controller is programmed to be able to handle multiple well profiles by storing the individual well characteristics, such as fluid properties and fluid reference points and using such information to be used in the calibration model as may be necessary. For instance, it may be desirable to attribute differential pressure calibration data to the individual well profile data and apply it to the pressure sensor each time the respective well is selected by the switch.

The present invention system and method enables application of individual calibration settings of the pressure sensors for different wells in a well pad thus, significantly increasing the accuracy of the resulting flow measurements and making possible to employ a single MPFM for all the wells in a well pad. This in turn results in significant capital savings.

EXAMPLE

An MPFM flow meter of the type that is commercially available under the name PhaseWatcher from Schlumberger is installed on a well pad to monitor production from eight wells. The differential pressure sensor of the MPFM has an uncertainty of 0.2% of the calibrated span and is initially calibrated for a pressure span of 0-5000 mbar. Consequently, the absolute uncertainty (error) for the MPFM equals 10 mbar. The flow rate was directly proportional to the square root of the pressure difference measures in the metering cell (over the Venturi throat). That is why in this example only the pressure difference as measured by differential pressure sensor is displayed.

TABLE 1

| 1 Well # | 2 Well differential pressure, mbar | 3 Current relative uncertainty (0.2% of span), % | 4 Contribution to the relative uncertainty of the total rate, % | 5 New calibrated span for differential pressure sensor, mbar | 6 Relative uncertainty after re-calibration, % |
|---|---|---|---|---|---|
| 1 | 5000 | 0.20 | 0.10 | 5000 | 0.20 |
| 2 | 3000 | 0.33 | 0.16 | 3300 | 0.22 |
| 3 | 1000 | 1.00 | 0.50 | 1100 | 0.22 |
| 4 | 800 | 1.25 | 0.63 | 900 | 0.23 |
| 5 | 500 | 2.00 | 1.00 | 600 | 0.24 |
| 6 | 200 | 5.00 | 2.50 | 250 | 0.25 |
| 7 | 100 | 10.00 | 5.00 | 150 | 0.30 |
| 8 | 50 | 20.00 | 10.00 | 100 | 0.40 |

It can be seen from column 6 that the relative uncertainty of the total flow rate after recalibration with the method of the invention is far lower than that for the standard configuration (column 3). The application of dynamic calibration of the differential pressure sensor for individual wells improves the overall accuracy.

The following information is given in Table 1:
Column #1: well number within the pad;
Column #2: the original pressure difference of flow from the individual wells for a given flow meter (e.g., Phase Watcher (Schlumberger) with a Venturi throat diameter of 52 mm);
Column #3: the relative error in differential pressure measurements in the case of a fixed reading span of 0-5000 mbar;
Column #4: contribution to the relative error of the total flow rate by the instrumental uncertainty of the sensor;
Column #5: the most appropriate span for each well determined and stored in the digital controller;
Column #6: the relative error of the differential pressure measurements after custom sequential calibration of the differential pressure sensor.

While the invention has been described in detail with particular reference to certain preferred embodiments thereof, it will be understood that variations and modifications can be effected within the spirit and scope of the invention, which is limited only by the appended claims and equivalents thereof.

The invention claimed is:

1. A system for measuring flow rates for effluents of individual petroleum wells in a well pad, comprising:
   a multiphase flowmeter comprising a pressure sensor;
   a valve assembly connected between each of the individual petroleum wells and the multiphase flowmeter, the valve assembly configured to connect and disconnect an effluent from a single selected individual petroleum well to the multiphase flowmeter; and
   means for performing custom-calibration of said pressure sensor for each individual petroleum well to enhance the accuracy of resulting flow rate measurements, wherein said custom-calibration means include a digital controller operably connected to the pressure sensor and the valve assembly, wherein the digital controller configured to determines a pressure drop range for each of the individual petroleum wells in the well pad, to selects and individual petroleum well for flow rate measurement, and to calibrates the flow meter with the pre-determined pressure drop range corresponding to the selected individual petroleum well.

2. The system of claim 1, wherein said digital controller is an integral part of said multiphase meter.

3. The system of claim 1, wherein the valve assembly includes a rotary valve having an annular valve body with a plurality of passages, each of which is connected to the flow from a single, individual well, and a rotor rotatable within the annular valve body having a passage mechanically compliant with the plurality of passages of the valve body that serially connects the flows from the individual wells to the multiphase flowmeter where the position of the rotor is registered.

4. The system of claim 1, wherein the multiphase flowmeter further includes means for creating a pressure drop across a measurement section of the multiphase flowmeter, said pressure drop to be measured by said pressure sensor.

5. The system of claim 4, wherein said pressure drop means is a Venturi or a choke and said pressure sensor is a differential pressure sensor.

6. The system of claim 1, wherein said multiphase flowmeter further comprises a fraction meter for measuring the individual fractions of the oil, water and gas in the effluent.

7. The system of claim 6, wherein said fraction meter is a gamma ray densitometer having a source of gamma rays positioned at a first window of an effluent pipe and a detector at second window of said effluent pipe positioned opposite said first window.

8. The system of claim 6, wherein said fraction meter is an X-ray fraction meter.

9. The system of claim 1, wherein the pressure sensor has a basic uncertainty ranging from 0.1% to 0.50% of a pressure range with which it is calibrated.

10. The system of claim 1, wherein the digital controller determines the pressure range for a particular well by determining the highest expected pressure measurement of a particular well.

11. A method for measuring flow rates for individual wells in a well pad by a single multiphase flowmeter, comprising:
   determining a pressure drop range for each of the wells in the well pad;
   selecting a first individual well for which a pressure drop range has been determined;

calibrating a differential pressure sensor of said single multiphase flowmeter with the pre-determined pressure drop range corresponding to the selected well, and measuring the flow rate of a fluid from the first selected well.

12. The method of claim 11, wherein a second individual well is selected, the single multiphase flowmeter is re-calibrated with the pre-determined pressure range corresponding to the second selected well, and the flow rate of the second selected well is measured.

13. The method of claim 11, wherein the recited steps are repeated until the flow rate of all of the wells is measured.

14. The method of claim 11, wherein the pressure drop range determined for a particular well corresponds to a range between zero and the highest expected pressure drop measurement of a particular well.

15. The method of claim 11, wherein the pressure drop range for each of the well is periodically updated.

16. The method of claim 11, wherein the differential pressure sensor has a basic uncertainty of from 0.1% to 0.5% of a pressure range span with which it is calibrated.

* * * * *